(12) United States Patent
Becker et al.

(10) Patent No.: US 6,197,979 B1
(45) Date of Patent: Mar. 6, 2001

(54) METHOD FOR PRODUCING POLYTETRAHYDROFURAN WITH LOW COLOR INDEX

(75) Inventors: Rainer Becker, Bad Dürkheim; Karsten Eller, Ludwigshafen; Heinz Rütter, Hochdorf-Assenheim; Michael Hesse, Worms, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/485,459

(22) PCT Filed: Jul. 25, 1998

(86) PCT No.: PCT/DE98/04673

§ 371 Date: Feb. 10, 2000

§ 102(e) Date: Feb. 10, 2000

(87) PCT Pub. No.: WO99/09086

PCT Pub. Date: Feb. 25, 1999

(30) Foreign Application Priority Data

Aug. 14, 1997 (DE) ............................................. 197 35 330

(51) Int. Cl.$^7$ ..................... C07D 307/93; C07D 315/00; C07D 407/14

(52) U.S. Cl. ........................... 549/472; 528/405; 528/412; 528/425

(58) Field of Search .............................. 549/472; 528/405, 528/412, 425

(56) References Cited

U.S. PATENT DOCUMENTS

| 4,189,566 | 2/1980 | Mueller et al. . |
| 4,243,799 | 1/1981 | Mueller et al. . |
| 4,480,124 | 10/1984 | Mueller . |
| 5,773,648 | 6/1998 | Becker et al. . |
| 5,886,138 | * 3/1999 | Muller . |

FOREIGN PATENT DOCUMENTS

| 28 01 792 | 7/1979 | (DE) . |
| 44 33 606 | 3/1996 | (DE) . |
| 061 668 | 10/1982 | (EP) . |
| 424 791 | 5/1991 | (EP) . |
| 94/05719 | 3/1994 | (WO) . |
| 98/15589 | 4/1998 | (WO) . |
| 98/58982 | 12/1998 | (WO) . |

* cited by examiner

Primary Examiner—Joseph K. McKane
Assistant Examiner—Taofiq A. Solola
(74) Attorney, Agent, or Firm—Keil & Weinkauf

(57) ABSTRACT

In a process for preparing polytetrahydrofuran, tetrahydrofuran copolymers, diesters or monoesters of these polymers having a low color number by polymerization of tetrahydrofuran in the presence of at least one telogen and/or comonomer over a heterogeneous catalyst, the polymerization is carried out in the presence of hydrogen.

11 Claims, No Drawings

METHOD FOR PRODUCING POLYTETRAHYDROFURAN WITH LOW COLOR INDEX

This Appl. is a 371 of PCT/EP98/04673 filed Jul. 25, 1998.

The present invention relates to a process for preparing polytetrahydrofuran, tetrahydrofuran copolymers, diesters or monoesters of these polymers having a low color number by polymerization of tetrahydrofuran in the presence of at least one telogen and/or comonomer over a heterogeneous catalyst.

Polytetrahydrofuran (PTHF), also called polyoxybutylene glycol, is a versatile intermediate in the plastics and synthetic fiber industries and is employed, inter alia, for preparing polyurethane, polyester and polyamide elastomers. Furthermore, it is, like some of its derivatives, a valuable auxiliary in many applications, for example as a dispersant or in the deinking of waste paper.

PTHF is advantageously prepared industrially by polymerization of tetrahydrofuran (THF) over suitable catalysts in the presence of reagents whose addition makes it possible to control the length of the polymer chains and thus to set the mean molecular weight to the desired value (chain termination reagents or "telogens"). This control is effected by selection of the type and amount of the telogen. In addition, selection of suitable telogens enables functional groups to be introduced at one end or both ends of the polymer chain. Thus, for example, use of carboxylic acids or carboxylic anhydrides as telogens enables the monoesters or diesters of PTHF to be prepared. Other telogens act not only as chain termination reagents, but are also incorporated into the growing polymer chain of the PTHF; they thus have not only the function of a telogen but also that of a comonomer and can therefore with equal justification be referred to as a telogen or as a comonomer. Examples of such comonomers are water or telogens containing two hydroxy groups, e.g. dialcohols. Examples of such dialcohols are ethylene glycol, propylene glycol, butylene glycol, 1,4-butanediol, 2-butyne-1,4-diol, 1,6-hexanediol or low molecular weight PTHF. Further suitable comonomers are 1,2-alkylene oxides such as ethylene oxide or propylene oxide, 2-methyltetrahydrofuran or 3-methyltetrahydrofuran. With the exception of water, 1,4-butanediol and low molecular weight PTHF, the use of such comonomers leads to the preparation of tetrahydrofuran copolymers. In this way, the PTHF can be chemically modified.

As comprehensive studies have shown, acid catalysts are suitable for the polymerization of THF on an industrial economical scale, but these have the disadvantageous effect that polymers having yellow to brownish discoloration are obtained. The discoloration increases with the temperature of the polymerization. Furthermore, the purity of the PTHF also depends on the quality of the THF used.

The technical grade contains small amounts of impurities in a concentration of from 10 to 500 ppm. Not all details of the chemical nature of these impurities are known. Although this THF is of very high purity (it normally has a purity of 99.9%), even traces of impurities cause the abovementioned discoloration in the polymerization. In addition, simultaneously with the discoloration, an altered reactivity is observed in the preparation of polyesters or polyurethanes from the polytetramethylene ether glycols. These are serious deficiencies since color and reproducible processing are among the most important properties of a polymer which is to be employed industrially.

For this reason, numerous processes for the pretreatment of technical-grade THF have been proposed for the purpose of improving the quality. Thus, for example, DE-A-2 801 792 describes a process in which THF is treated with bleaching earths prior to the polymerization. Although this gives polymers having an improved color number, this treatment method cannot be applied reproducibly in every case to any available technical grade of THF.

Furthermore, there are processes known for decolorizing the polymers obtained using acid heterogeneous catalysts in a separate decolorization process after conclusion of the polymerization.

According to EP-A 61 668, polytetramethylene ether glycols or polytetramethylene glycol diesters having a low color number are prepared by subjecting the polymers obtained by cationic polymerization of THF to treatment with hydrogen in the presence of a hydrogenation catalyst. If a THF grade as is offered on the market is used in the polymerization, one is forced to carry out the hydrogenative decolorization, at very high hydrogen pressures of, for example, from 50 to 300 bar.

PCT/WO 94/05719 discloses a process for preparing polytetrahydrofuran diesters in which the polymerization of the THF is carried out over acid-activated kaolin, zeolites or amorphous aluminum silicates in the presence of from 1 to 10% by weight of a hydrogenation catalyst and hydrogen.

The processes described in PCT/WO 94/05719 and EP-A 61668 have the disadvantage that an additional catalyst is necessary for preparing pure polytetrahydrofuran diesters.

It is an object of the present invention to find a process for preparing polytetrahydrofuran, tetrahydrofuran copolymers, diesters and monoesters of these polymers which enables polymers and copolymers of THF having a low color number to be prepared simply and economically.

We have found that this object is achieved by a process for preparing polytetrahydrofuran, tetrahydrofuran copolymers, diesters or monoesters of these polymers having a low color number by polymerization of tetrahydrofuran in the presence of at least one telogen and/or comonomer over a heterogeneous catalyst, wherein the polymerization is carried out in the presence of hydrogen.

The novel process allows highly pure polytetrahydrofuran, highly pure tetrahydrofuran copolymers and highly pure diesters or monoesters of these polymers having a low color number to be prepared reliably and reproducibly.

The novel process enables THF polymers and copolymers having color numbers of from 5 to 30 APHA to be prepared even from lower THF grades. The determination of the color numbers is described in the standards DIN 53 409 and ASTM-S-1209.

The preparative process of the present invention is carried out in the presence of hydrogen which is dispersed in the reaction mixture, for example by means of nozzles, gas-introduction rings, gas-introduction stirrers or through a perforated plate. The setting of a particular hydrogen bubble diameter is not critical for the process of the present invention. The polymerization is carried out at hydrogen pressures of from 0.1 to 50 bar, preferably from 0.5 to 5 bar, particularly preferably from 0.7 to 2 bar.

Polymerization catalysts used in the process of the present invention can be sheet silicates which may have been, if desired, activated by acid treatment or supported catalysts comprising an oxidic support material and a catalytically active amount of a tungsten or molybdenum compound or mixtures of such compounds or a metal sulfate, metal hydrogen sulfate and/or metal oxide sulfate.

Suitable supported catalysts comprising an oxidic support material and oxygen-containing molybdenum or tungsten compounds or mixtures of such compounds as catalytically active compounds, which catalysts may also, if desired, be additionally doped with sulfate or phosphate groups, are described in DE-A 44 33 606, which is hereby expressly incorporated by reference.

Also suitable are the supported catalysts described in the German Patent Application No. 194649803.1, which is hereby expressly incorporated by reference, which catalysts comprise as active composition a catalytically active amount of at least one oxygen-containing molybdenum and/or tungsten compound and have, after application of the precursor compounds of the active composition to the support material precursor, been calcined at from 500° C. to 1000° C. and contain a promoter comprising at least one element or compound of an element of groups 2, 3 including the lanthanides, 5, 6, 7, 8 or 14 of the Periodic Table of the Elements.

These catalysts generally contain from 0.01 to 30% by weight, preferably from 0.05 to 20% by weight and particularly preferably from 0.1 to 15% by weight, of promoter, calculated as the sum of its constituents in the form of their elements and based on the total weight of the catalyst.

The catalysts which can be employed according to the present invention and are known from DE-Ak 44 33 606 and the German Patent Application No. 194649803.1 generally contain from 0.1 to 50% by weight, preferably from 1 to 30% by weight and particularly preferably from 5 to 20% by weight, of the catalytically active, oxygen-containing compounds of molybdenum or tungsten or the mixtures of the catalytically active, oxygen-containing compounds of these metals, in each case based on the total weight of the catalyst and, since the chemical structure of the catalytically active, oxygen-containing compounds of molybdenum and/or tungsten is not known precisely at the present time but can only be postulated, for example from the IR spectra of the catalysts which can be employed according to the present invention, in each case calculated as $MoO_3$ or $WO_3$.

Suitable oxidic supports are, for example, zirconium dioxide, titanium dioxide, hafnium oxide, yttrium oxide, iron(III) oxide, aluminum oxide, tin(IV) oxide, silicon dioxide, zinc oxide or mixtures of these oxides. Particular preference is given to zirconium dioxide, titanium dioxide and/or silicon dioxide.

Further suitable polymerization catalysts for the process of the present invention are supported catalysts comprising at least one metal sulfate, metal hydrogen sulfate, metal oxide sulfate or a mixture thereof on the abovementioned oxidic supports.

As metal sulfates, metal hydrogen sulfates and/or metal oxide sulfates, the catalyst used according to the present invention can comprise those of groups 1 (Na, K, Rb, Cs), 3 (Sc, Y, La) including the lanthanides (Ce, Pr, Nd, Pm, Sm, Eu, Gd, Tb, Dy, Ho, Er, Tm, Yb, Lu), 4 (Ti, Zr, Hf), 7 (Mn,Re), 8 (Fe, Ru, Os) 10 (Ni, Pd, Pt), 11 (Cu, Ag, Au), 12 (Zn) and 13 (Al) of the Periodic Table.

Particular preference is given to using the sulfates of Sc, Y, La, the lanthanides, Al, Cu, Ni, Zn or Mn(II), sodium hydrogen sulfate, titanium oxide sulfate, zirconium oxide sulfate or mixtures thereof and particular preference is given to using cerium(IV) sulfate, lanthanum(III) sulfate, yttrium (III) sulfate or mixtures thereof.

The catalyst contains from 2 to 30% by weight, based on the total weight of the catalyst, of a metal sulfate, metal hydrogen sulfate, metal oxide sulfate or mixture thereof, preferably from 2 to 20% by weight, particularly preferably from 7 to 17% by weight.

The supported catalysts comprising at least one metal sulfate, metal hydrogen sulfate, metal oxide sulfate or mixture thereof and also their preparation are described in the German Patent Application No. 19726507.3, which is hereby expressly incorporated by reference.

Apart from the abovementioned polymerization catalysts, sheet silicates which may, if desired, have been activated by an acid treatment can be used as heterogeneous catalyst in the process of the present invention. As sheet silicates, preference is given to using those of the montmorillonite-saponite, kaolin-serpentine or palygorskite-sepiolite group, particularly preferably montmorillonite, hectorite, kaolin, attapulgite or sepiolite, as are described, for example, in Klockmanns Lehrbuch der Mineralogie, 16th edition, F. Euke Verlag 1978, pages 739–765.

In the process of the present invention, it is possible to use, for example, those montmorillonites as are obtainable under the names Tonsil®, Terrana® or Granosil® or as catalyst grades K 10, KSF-O, KO or KS from Sud-Chemie AG, Munich. Attapulgites suitable for use in the process of the present invention are sold, for example, by Engelhard Corporation, Iselin, USA, under the trade names Attasorb® RVM and Attasorb®R LVM.

Preference is given to using essentially anhydrous sheet silicates which are obtained from the commercial water-containing sheet silicates by drying at from 80 to 200° C. at atmospheric pressure or subatmospheric pressure. The water content should be, in particular, less than 0.1% by weight and should not exceed 0.2% by weight.

The above-described heterogeneous catalysts which can be employed in the process of the present invention can be additionally doped with transition metals of groups 7 to 10 of the Periodic Table, for example with ruthenium, rhenium, nickel, iron, cobalt, palladium and/or platinum, preferably with palladium. One way of doping the catalysts is to impregnate the catalyst with a solution, for example an aqueous or alcoholic solution, of a salt, for example a halide, an acetate, an oxalate, a citrate and/or a nitrate, of the above-described transition metal ions. The impregnation can be carried out by soaking the catalyst with the transition metal salt solutions or by spraying these solutions onto the catalyst. The catalyst is subsequently dried and, if appropriate, additionally calcined at from 200 to 600° C. The doped catalysts are activated by treatment with hydrogen or other reducing agents such as hydrazine. This activation can also be carried out during the polymerization.

The heterogeneous catalysts which can be employed according to the present invention can be used in the process of the present invention in the form of powder, for example when carrying out the process by a suspension method, or advantageously as shaped bodies, eg. in the form of cylinders, spheres, rings or granules, in particular when the catalyst is arranged as a fixed bed, which is preferred when using, for example, loop reactors or when the process is carried out continuously.

Telogens, ie. substances which effect chain termination of the polymerization reaction, which are suitable in the preparation of PTHF diesters are carboxylic anhydrides which are derived from $C_2$–$C_{20}$-monocarboxylic acids, for example acetic anhydride, propionic anhydride and butyric anhydride. The PTHF diesters formed when using these telogens can be converted into PTHF by various methods (eg. as described in U.S. Pat. No. 4,460,796).

Telogens used for preparing the PTHF monoesters of monocarboxylic acids are generally $C_1$–$C_{20}$-monocarboxylic acids, preferably $C_1$–$C_8$-monocarboxylic acids and particularly preferably formic acid and acetic acid.

A suitable telogen for preparing copolymers of THF is 1,4-butynediol. The resulting copolymer can subsequently be converted into PTHF by hydrogenation of the triple bonds, but itself also displays interesting properties.

Other copolymers of THF can be obtained by use of 1,2-alkylene oxides, preferably ethylene oxide or propylene oxide, 2-methyltetrahydrofuran, 3-methyltetrahydrofuran or diols such as ethylene glycol or 1,6-hexanediol.

When using the telogens water and/or 1,4-butanediol, PTHF is obtained in one step in the process of the present invention. If desired, low molecular weight, open-chain PTHF having a molecular weight of from 200 to 700 dalton can also be recirculated as telogen to the polymerization reaction where it is converted into higher molecular weight PTHF. Since 1,4-butanediol and low molecular weight PTHF have two hydroxy groups, they are not only attached as telogens to the ends of the PTHF chain but are also incorporated as monomers into the PTHF chain.

The telogen is advantageously added to the polymerization as a solution in THF, with preference being given to a telogen content of from 0.04 to 17 mol %, based on tetrahydrofuran. Since the telogen effects the termination of the polymerization, the mean molecular weight of the PTHF or PTHF diester can be controlled via the amount of telogen used. The more telogen present in the reaction mixture, the lower the mean molecular weight of the PTHF or the relevant PTHF derivative. Depending on the telogen content of the polymerization mixture, it is possible to prepare PTHFs or the relevant PTHF derivatives having mean molecular weights of from 250 to 10,000 in a targeted manner. The process of the present invention is preferably used to prepare PTHFs or the relevant PTHF derivatives having mean molecular weights of from 500 to 10,000 dalton, particularly preferably from 650 to 5000 dalton.

The polymerization is generally carried out at from 0 to 100° C., preferably from 30° C. to 70° C.

To avoid the formation of ether peroxides, the polymerization is advantageously carried out under an inert gas atmosphere. Inert gases which can be employed are, for example, nitrogen, carbon dioxide or the noble gases; preference is given to using nitrogen.

The proportion of inert gas can be reduced if the polymerization is carried out at relatively high hydrogen pressures within the above-described range for the hydrogen pressure.

The process of the present invention can be carried out batchwise or continuously. For economic reasons, the continuous method is generally preferred.

In the batchwise method, the reactants THF, the telogen concerned and the catalyst are generally reacted in a stirred vessel or loop reactor at the temperatures indicated in the presence of hydrogen until the desired conversion of THF is reached. Depending on the amount of catalyst added, the reaction time can be from 0.5 to 40 hours, preferably from 1 to 30 hours. In the polymerization, the catalysts are generally used in an amount of from 1 to 90% by weight, preferably from 4 to 70% by weight and particularly preferably from 8 to 60% by weight, based on the weight of THF used.

For the work-up, the reaction product is, in the case of the batchwise method, separated from the catalyst present therein, advantageously by filtration, decantation or centrifugation. The polymerization product which has been freed of the catalyst is generally worked up by distillation, where unreacted THF is advantageously distilled off and then, if desired, low molecular weight PTHF oligomers are separated from the polymer by distillation under reduced pressure.

EXAMPLES 1 to 3

A 1 l three-neck flask equipped with a stirrer, heating and a frit for introducing the hydrogen was in each case charged with 455 g of tetrahydrofuran and 45 g of acetic anhydride. After addition of 25 g of a catalyst A, B or C, the mixture was heated at 50° C. for 6 hours, with from 10 to 15 l/h of hydrogen at atmospheric pressure being passed through the system. The reaction mixture was subsequently cooled, filtered and the filtrate was evaporated. After removing unreacted tetrahydrofuran by distillation, yield and color number of the polytetrahydrofuran diacetate were determined.

Catalyst A: acid-activated montmorillonite (K 10 from Sudchemie AG)
Catalyst B: catalyst A, doped with 0.1% of Pd
Catalyst C: 20% $WO_3/ZrO_2$, calcined at 675° C. for 2 h
Catalyst D: extruded, acid-activated montmorillonite (XMP-4® from Laporte)
Catalyst E: catalyst D, doped with 0.1% of palladium The results are shown in Table 1 below.

Comparative examples V1 to V3

Using a method similar to Example 1, tetrahydrofuran was reacted with acetic anhydride over the catalysts A, B or C in the same ratios, but no hydrogen was passed in. After removing unreacted tetrahydrofuran by distillation, yield and color number of the polytetrahydrofuran diacetate were determined. The results are shown in Table 1.

TABLE 1

| Example | Catalyst | Hydrogen | Yield of PTHF [%] | Color number [APHA] |
|---|---|---|---|---|
| 1 | A | + | 55.1 | 30 |
| C1 | A | − | 57.1 | 70 |
| 2 | B | + | 57.1 | 5 |
| C2 | B | − | 56.9 | 10 |
| 3 | C | + | 20.6 | 30 |
| C3 | C | − | 17.9 | 125 |

Comparison of t he Examples 1 to 3 according to the present invention with the Comparative Examples C1, C2 and C3 which are not according to the present invention shows that polytetrahydrofuran diesters having a significantly lower color number are obtained in the presence of hydrogen according to the process of the present invention.

EXAMPLES 4 to 8

Using a method similar to Example 1, tetrahydrofuran was reacted with acetic anhydride over montmorillonite (catalyst A or catalyst B) in the same ratio, but methacrolein or 2,3-dihydrofuran were added to the reaction mixture as model substance for unknown impurities which adversely affect the color number. The experimental conditions and the yields and color numbers of the polytetrahydrofuran diacetate are summarized in Table 2.

Comparative Examples V4 to V8

Using a method similar to Examples 4 to 8, tetrahydrofuran was reacted with acetic anhydride over montmorillonite (catalyst A or catalyst B) in the presence of methacrolein or 2,3-dihydrofuran, but no hydrogen was passed in. The experimental conditions and the yields and color numbers of the polytetrahydrofuran diacetate are shown in Table 2.

TABLE 2

| Ex. | Catalyst | Additive | Hydrogen | Yield PTHF [%] | Color No. [APHA] |
|---|---|---|---|---|---|
| 4 | A | 50 ppm of methacrolein | + | 64.9 | 30 |
| C4 | A | 50 ppm of methacrolein | − | 65.3 | 50 |
| 5 | A | 100 ppm of methacrolein | + | 64.6 | 40 |
| C5 | A | 100 ppm of methacrolein | − | 65.4 | 60 |
| 6 | A | 500 ppm of methacrolein | + | 64.6 | 60 |
| C6 | A | 500 ppm of methacrolein | − | 65.1 | 150 |
| 7 | B | 500 ppm of methacrolein | + | 58.3 | 15 |
| C7 | B | 500 ppm of methacrolein | − | 57.1 | 150 |
| 8 | B | 500 ppm of dihydrofuran | + | 57.9 | 15 |
| C8 | B | 500 ppm of dihydrofuran | − | 57.6 | 80 |

Comparison of the Examples 4 to 8 with the Comparative Examples C4 to C8, which are not according to the present invention shows that polytetrahydrofuran diesters having a significantly lower color number are obtained in the presence of hydrogen.

Continuous Polymerization of THF

EXAMPLE 9

A 1.5 l fixed-bed reactor was charged with 1.2 l (760 g) of catalyst E. A circulation pump was present to pump the reaction mixture around. After the reactor, pump and pipelines had been completely filled with a reaction mixture of tetrahydrofuran and 6.9% by weight of acetic anhydride, the circulation pump was switched on and the reaction temperature was adjusted to 45° C. 120 ml/h of reaction mixture were metered continuously into the circuit from above over 14 days, the return being 5 l/h while hydrogen gas was introduced into the reactor from below at atmospheric pressure. The circulation/feed ratio was about 40. The amount of hydrogen introduced per hour was 0.6 l/h initially and was reduced to 0.1 l/h during the first week. The yield and color number of the polytetrahydrofuran diacetate was determined daily from the product streams by distillative separation of unreacted tetrahydrofuran. The mean yield of polytetrahydrofuran diacetate over the reaction time from the seventh to fourteenth day was 53%. The polytetrahydrofuran diacetate obtained had a color number of 5 APHA and a molecular weight of 840 daltons.

EXAMPLE C 9

Tetrahydrofuran was reacted with acetic anhydride over catalyst D analogously to Example 9, but with no introduction of hydrogen gas. After a reaction time of 14 days, a mean yield of polytetrahydrofuran diacetate of 56 at a color number of 100 APHA was found over the reaction time. The molecular weight of the polytetrahydrofuran diacetate was 880 daltons.

Compared with the non-inventive Example C9, Example 9 shows that the color number can be significantly reduced, even in continuous operation, without significant reductions in conversion being recorded. The slightly lower conversion results from a small amount of gas bubbles on the catalyst.

We claim:

1. A process for preparing polytetrahydrofuran or polytetrahydrofuran modified by at least one telogen and/or comonomer and having a low color number by polymerization of tetrahydrofuran in the presence of i at least one telogen and/or comonomer ii with a heterogeneous catalyst, with the exception of (a) acid-activated and calcined zeolites or kaolin, (b) synthetic amorphous aluminum silicates and (c) supported catalysts comprising an oxidic support material and a catalytically active amount of a tungsten or molybdenum compound or mixtures thereof iii wherein the polymerization is carried out in the presence of molecular hydrogen and wherein the telogen and/or comonomer is a carboxylic acid anhydride, a monocarboxylic acid, a 1,2-alkylene oxide, a dialcohol, a low molecular weight polytetrahydrofuran, water, 2-methyltetrahydrofuran or 3-methyltetrahydrofuran.

2. A process as claimed in claim 1, wherein the polymerization is carried out at hydrogen pressures of from 0.1 to 5 bar.

3. A process as claimed in claim 1, wherein the heterogeneous catalyst used is a sheet silicate which optionally has been activated by acid treatment or a supported catalyst comprising a metal sulfate, metal hydrogen sulfate and/or metal oxide sulfate.

4. A process as claimed in claim 3, wherein the sheet silicate used is montmorillonite, bentonite, attapulgite or sepiolite.

5. A process as claimed in claim 3, wherein the support material used is zirconium dioxide, titanium dioxide and/or silicon dioxide.

6. A process as claimed in claim 1, wherein the heterogeneous catalyst has been doped with one or more transition metals of groups 7 to 10 of the Periodic Table of the Elements.

7. A process as claimed in claim 1, wherein the telogen used is water, 1,4-butanediol or polytetrahydrofuran having a molecular weight of from 200 to 700 dalton.

8. A process as claimed in claim 1, wherein the telogen used is acetic anhydride.

9. A process as claimed in claim 1, wherein the telogen used is formic acid or acetic acid.

10. A process as claimed in claim 1, wherein tetrahydrofuran having a telogen content of from 0.04 to 17 mol %, based on tetrahydrofuran, is used in the polymerization.

11. The process of claim 3, wherein the support for the supported catalyst is an oxidic support.

* * * * *